(12) United States Patent
Kreiner et al.

(10) Patent No.: US 10,591,633 B2
(45) Date of Patent: Mar. 17, 2020

(54) OPTICAL ENVIRONMENTAL FILTER WITH INTRUSION PROTECTION

(71) Applicant: AT&T Intellectual Property I, L.P., Atlanta, GA (US)

(72) Inventors: Barrett Kreiner, Woodstock, GA (US); Jonathan Reeves, Titusville, FL (US); Ryan Schaub, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 201 days.

(21) Appl. No.: 15/852,792

(22) Filed: Dec. 22, 2017

(65) Prior Publication Data

US 2019/0196055 A1   Jun. 27, 2019

(51) Int. Cl.
*G01V 8/20* (2006.01)
*G01V 8/12* (2006.01)

(52) U.S. Cl.
CPC ..................................... *G01V 8/12* (2013.01)

(58) Field of Classification Search
CPC .......... G01V 8/20; G08B 13/00; G08B 13/18; G01B 11/14; G01B 11/06; G01B 11/24; G02B 27/00; G01J 1/04; H04B 10/00; H01J 40/14
See application file for complete search history.

(56) References Cited

U.S. PATENT DOCUMENTS

| | | | |
|---|---|---|---|
| 3,683,352 A | 8/1972 | West et al. | |
| 4,384,201 A * | 5/1983 | Carroll | G01V 8/20 250/221 |
| 5,281,809 A | 1/1994 | Anderson et al. | |
| 5,404,008 A | 4/1995 | Malinowski et al. | |
| 6,635,862 B2 | 10/2003 | Shteynberg et al. | |
| 6,856,862 B1 | 2/2005 | Feltner | |
| 6,984,818 B1 | 1/2006 | Breed et al. | |
| 8,067,750 B2 | 11/2011 | Deal | |
| 8,597,569 B2 | 12/2013 | Gruen et al. | |
| 9,103,723 B2 | 8/2015 | Hayden et al. | |
| 9,374,884 B2 | 6/2016 | Mitra | |
| 9,511,159 B2 | 12/2016 | Kreiner et al. | |

(Continued)

FOREIGN PATENT DOCUMENTS

FR    2479001 A1    10/1981

*Primary Examiner* — Georgia Y Epps
*Assistant Examiner* — Don J Williams
(74) *Attorney, Agent, or Firm* — Hartman & Citrin LLC

(57) ABSTRACT

Concepts and technologies for optical environmental filtering with intrusion protection are provided. In an embodiment, a system can include a first intrusion detection frame structure, a second intrusion detection frame structure, a controller unit, and a laser filter frame structure that is disposed between the first intrusion detection frame structure and the second intrusion detection frame structure. The laser filter frame structure can include at least one laser emitter that projects at least one laser beam that forms a laser emission plane between the first light intrusion plane and the second light intrusion plane. The controller unit can activate at least one laser emitter, and in response to detecting an object passing through the first light intrusion plane, deactivate a laser emitter to pause creation of the laser emission plane. The controller can reactivate a laser emitter before the object passes through the second light intrusion plane.

20 Claims, 3 Drawing Sheets

(56) References Cited

U.S. PATENT DOCUMENTS 9,597,420 B2     3/2017   Maxik et al.
2015/0343104 A1   12/2015   Maxik et al.
2017/0246329 A1    8/2017   Lloyd

* cited by examiner

OPTICAL ENVIRONMENTAL FILTER WITH INTRUSION PROTECTION

BACKGROUND

Particulate filtration has conventionally occurred using a porous filter media, such as a conventional air filter that has fibrous material to remove and/or reduce solid particulates (e.g., dust, mold, pollen, bacteria, etc.) from the air. However, conventional air filters, or other porous filter media, may prevent objects larger than a certain size (e.g., greater than a micrometer, millimeter, etc.) from passing through. As such, a human typically cannot walk or otherwise put an object through the porous filter media without tearing or otherwise damaging the filter medium. Thus, in some instances, conventional techniques may locate an air filter or other such porous filter media at a location adjacent to a workspace, hallway, office, bedroom, or other such physical environment in which humans, animals, machines, or objects interact. However, the air filters may rely on a fan or other such mechanism to draw air or fluids through the porous filter media in order for the filtration to occur. When a large volume of air is sought to be conditioned, the fan speed may have to increase to allow for enough fluid movement and filtration. In some instances, the increased fan speeds and/or motors running the fans can be quite loud and cause distractions to humans in the adjacent environment. Additionally, environmental particulate matter (e.g., dust, air-borne bacterial, etc.) may not be filtered if the circulation within the environment is not adequate. In some environments, a change in temperature and/or season may cause insects to find entrances into the environment. Moreover, conventional air filters may not be able to deter pests. Chemical pesticides can be effective against pests; however, it may have a deleterious effect on humans who are sensitive to the chemical exposure. This may be undesirable in environments such as a train station, office building, or other public place where consent has not been obtained of the people passing by.

SUMMARY

The present disclosure is directed to optical environmental filtering with intrusion protection. According to one aspect of the concepts and technologies disclosed herein, a laser filter system is disclosed. In an embodiment, the laser filter system can include a first intrusion detection frame structure, a second intrusion detection frame structure, a laser filter frame structure, and a controller unit. The first intrusion detection frame structure can form a first light intrusion plane. In some embodiments, the first intrusion detection frame structure can include a photon emitter configured to project a first light beam, and at least one reflective surface that redirects the first light beam to form the first light intrusion plane. The second intrusion detection frame structure can form a second light intrusion plane. In some embodiments, the second intrusion detection frame structure can include a photon emitter configured to project a second light beam, and at least one reflective surface that redirects the second light beam to form the second light intrusion plane. The laser filter frame structure can be disposed between the first intrusion detection frame structure and the second intrusion detection frame structure. The laser filter frame structure can include at least one laser emitter that projects at least one laser beam that forms a laser emission plane between the first light intrusion plane and the second light intrusion plane. The controller unit can include a processor and a memory that stores computer-executable instructions that, in response to execution by the processor, cause the processor to perform operations. The operations can include activating the at least one laser emitter of the laser filter frame structure to create the laser emission plane. In response to detecting an object passing through the first light intrusion plane, the operations also can include deactivating the at least one laser emitter of the laser filter frame structure to pause creation of the laser emission plane. In response to detecting that the object has passed through the first light intrusion plane but that the object has not passed through the second light intrusion plane, the operations can include reactivating the at least one laser emitter of the laser filter frame structure to create the laser emission plane.

In some embodiments, the laser filter system can include a position adjustment unit. The position adjustment unit can attach to the laser filter frame structure. The position adjustment unit can communicatively couple to the controller unit. In some embodiments, the position adjustment unit can be configured to increase or decrease a separation distance formed between the laser emission plane and at least one of the first light intrusion plane or the second light intrusion plane. In some embodiments, the separation distance can correspond with a distance between the laser emission plane and a closest active light intrusion plane, such as the first light intrusion plane or the second light intrusion plane. The laser emission plane created by the at least one laser emitter of the laser filter frame structure can be configured to have a passive beam power. In some embodiments, the passive beam power of the laser emitter can be in excess of five milliwatts. In some embodiments, the at least one laser emitter of the laser filter frame structure can be reactivated to provide a filtering beam power that is higher than the passive beam power.

The laser emission plane created by the at least one laser emitter of the laser filter frame structure can be configured to create ultraviolet light. The first light intrusion plane and the second light intrusion plane can be configured to include infrared light. In some embodiments, the laser filter frame structure can be configured to reside within at least one of a network equipment cabinet, a user equipment housing, a threshold of a room, a computer housing, or a threshold of a passageway.

In another embodiment according to one aspect of the concepts and technologies disclosed herein, a laser filter system is disclosed. In an embodiment, a laser filter system can include a first plurality of intrusion detection frame structures, a second plurality of intrusion detection frame structures, a laser filter frame structure, and a controller unit. In some embodiments, the first plurality of intrusion detection frame structures can be configured to form a first plurality of light intrusion planes. The second plurality of intrusion detection frame structures can be configured to form a second plurality of light intrusion planes. The laser filter frame structure can include at least one laser emitter that projects a laser beam that forms a laser emission plane between the first plurality of light intrusion planes and the second plurality of light intrusion planes. The controller unit can include a processor, and a memory that stores computer-executable instructions that, in response to execution by the processor, cause the processor to perform operations. The operations can include activating the at least one laser emitter of the laser filter frame structure to create the laser emission plane. In response to detecting an object passing through at least one of the first plurality of light intrusion planes, the operations also can include deactivating the at least one laser emitter of the laser filter frame structure to pause creation of the laser emission plane. In response to detecting that the object has passed through the first plurality of light intrusion planes, but the object has not passed through at least one of the second plurality of light intrusion planes, the operations also can include reactivating the at least one laser emitter of the laser filter frame structure to create the laser emission plane. In some embodiments, the operations can further include adjusting a separation distance formed between the laser emission plane and the first plurality of light intrusion planes by deactivating at least one light intrusion plane of the first plurality of light intrusion planes while maintaining activation of the remaining light intrusion planes of the first plurality of light intrusion planes.

In some embodiments, the laser emission plane created by the at least one laser emitter of the laser filter frame structure can be configured to have a passive beam power in excess of five milliwatts. In some embodiments, the at least one laser emitter of the laser filter frame structure is reactivated to provide a filtering beam power that is higher than the passive beam power. In some embodiments, the laser emission plane created by the at least one laser emitter of the laser filter frame structure is configured to create ultraviolet light. In some embodiments, the first plurality of light intrusion planes and the second plurality of light intrusion planes can be configured to include infrared light. In some embodiments, the laser filter frame structure can be configured to reside within at least one of a network equipment cabinet, a threshold of a room, a computer housing, or a threshold of a passageway.

According to another aspect of the concepts and technologies disclosed herein, a computer storage medium is disclosed. The computer storage medium can be included in a laser filter system. The computer storage medium can store computer-executable instructions that, when executed by a processor, cause the processor to perform operations. The operations can include activating a first light intrusion plane created by a first intrusion detection frame structure. The operations also can include activating a second light intrusion plane created by a second intrusion detection frame structure. The operations can further include activating at least one laser emitter of a laser filter frame structure to create a laser emission plane. The laser emission plane can be created between the first light intrusion plane and the second light intrusion plane. The operations can include deactivating the at least one laser emitter of the laser filter frame structure to pause creation of the laser emission plane. In some embodiments, deactivating the at least one laser emitter can occur in response to detecting an object passing through the first light intrusion plane. The operations can also include reactivating the at least one laser emitter of the laser filter frame structure to create the laser emission plane. In some embodiments, reactivating the at least one laser emitter can occur in response to detecting that the object has passed through the first light intrusion plane but that the object has not passed through the second light intrusion plane.

In some embodiments, the operations can also include adjusting a separation distance that separates the laser emission plane from the first light intrusion plane by activating a third light intrusion plane created by a third intrusion detection frame structure and deactivating the first light intrusion plane. In some embodiments, the third intrusion detection frame structure can be located between the first intrusion detection frame structure and the laser filter frame structure. In some embodiments, the laser emission plane created by the at least one laser emitter of the laser filter frame structure can be configured to have a passive beam power in excess of five milliwatts. In some embodiments, the at least one laser emitter of the laser filter frame structure can be reactivated to provide a filtering beam power that is higher than the passive beam power. The laser emission plane created by the at least one laser emitter of the laser filter frame structure can be configured to create ultraviolet light. In some embodiments, the first light intrusion plane and the second light intrusion plane can be configured to include infrared light.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
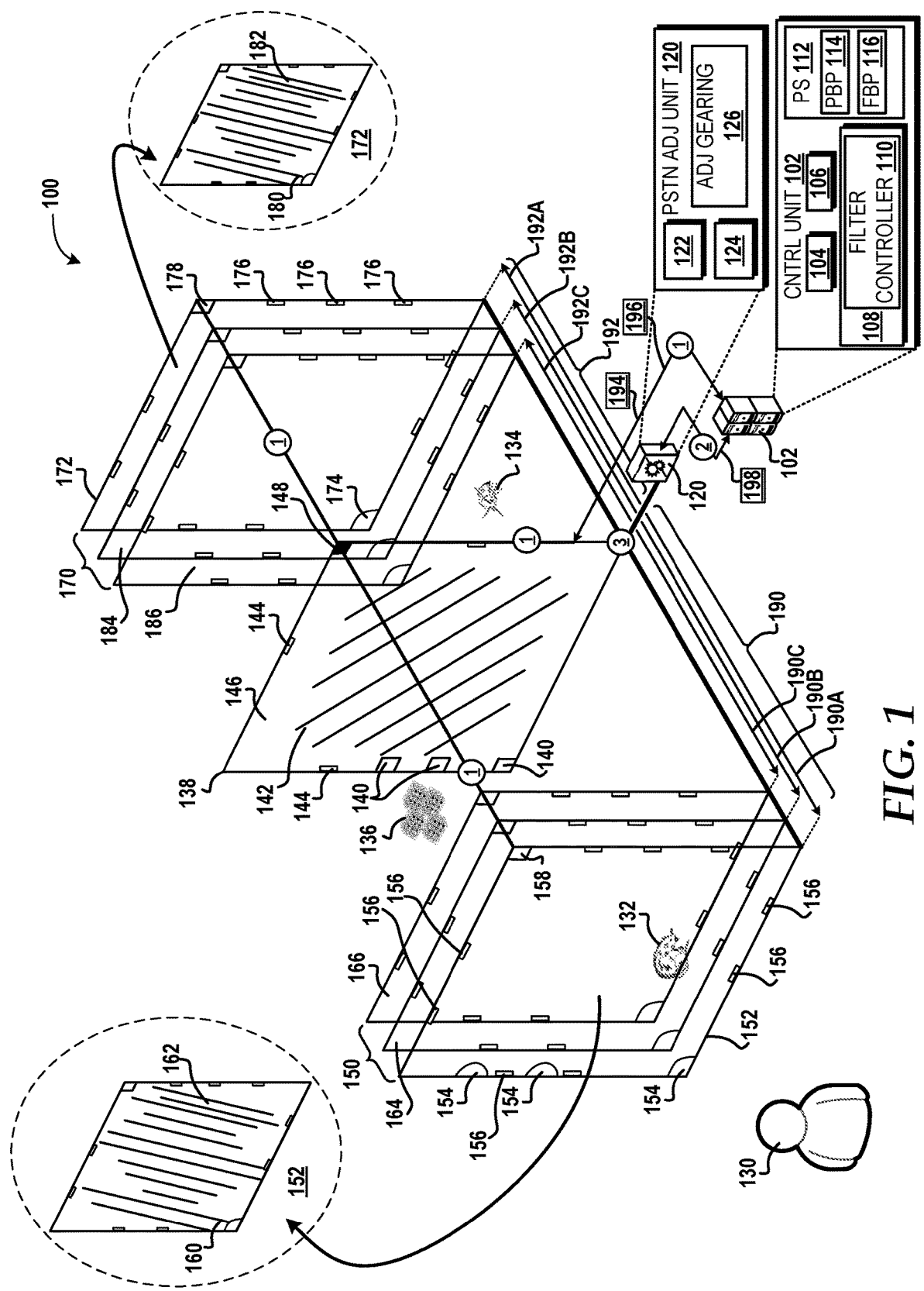
FIG. 1 is a diagram showing a laser filter system for various embodiments of the concepts and technologies described herein.

The following detailed description is directed to optical environmental filtering with intrusion protection. Filtration can provide removal of unwanted substances from an environment, such as a volume of air or other gases. In many environments, air can be a medium that carries suspended, undesirable particulates, which in some instances can be contaminates to objects that are also occupying the environment. Sometimes, these particulates can include physical items that can induce allergic reactions in humans and animals, such as dust, dander, pollen, mold spores, or the like. There also can be the potential for particulates to include organic material, such as viruses, bacterial, and/or molds, that may have the potential to induce reactions from humans and animals. In some environments, gases and particulates that are physically undesirable, such as fumes, smoke, or foul smells can exist. In addition to particulates, some environments may contain small objects that can move in and around the space. For example, some undesirable small objects can be organisms such as roaches, ants, spiders, and/or airborne organisms such as gnats, mosquitos, flies, ticks, or the like.

In addition to air being important for living organisms, air may also be implemented in some mechanical systems such as for heating or cooling. In some instances, small particulate matter can contaminate and/or otherwise negatively impact the operational performance of mechanical systems. To reduce airborne contaminates, many conventional techniques include flowing air over a porous filter media that can be made of organic and/or synthetic fiber and/or mesh materials in order to trap the particulates in the filter. Although particulate material can become trapped by conventional filters, these conventional techniques can reduce volumetric flow. Moreover, in order for conventional filters to capture smaller particulate (e.g., at the micron size), a tighter weave or mesh is typically required, thereby further increasing flow resistance. Also, as filters accumulate captured particulates, their effectiveness can be reduced and the amount of effort to move air through the conventional filter media increases, thereby requiring the conventional filter to be replaced at regular intervals. The conventional filter media is typically effective at handling contaminates when they are present in gases, but typically fail to allow for solid and/or liquid objects to pass through these filters. Thus, objects larger than a micron size typically will not pass through the conventional filter, and therefore require the conventional filters to be removed or otherwise displaced in order to allow larger objects to pass through a space in which the filter occupies. As such, conventional filters are typically ineffective in outdoor settings, where large volumes of air move through an area.

Therefore, embodiments of the present disclosure provide a laser filter system that can effectively remove, neutralize, sanitize, kill, vaporize, or otherwise reduce biological and particulate contaminates by sufficiently heating the particles to vaporize or reduce their physical structures. In various embodiments, the laser filter system can have multiple laser emitters and reflective optics that can transform a single beam into a laser emission plane (e.g., in the shape of an arc, a curtain, and/or plane of photons) that can provide filtering to objects that pass through the laser emission plane. The laser emitter(s) can be located in and/or on a laser filter frame structure which, in some embodiments, can have a groove or channel that can prevent photons from forming an angle of incidence beyond the laser emission plane. In some instances, the laser emission plane can be considered to define a two-dimensional laser plane and/or laser wall that can provide a varied beam power based on the level of filtration being implemented. The laser filter system can also have one or more intrusion detection frame structures that enable the creation of one or more light intrusion planes on either side of the laser emission plane. The laser filter system can include a controller unit that can communicatively, electrically, and/or mechanically couple with each of the laser emission plane and each of the light intrusion planes. The controller unit can use each intrusion detection frame structure to detect variations in the light intrusion plane, such as when an object (e.g., small particulate like dust and/or large objects like human, etc.) is passing through the light intrusion plane. The controller unit can use each intrusion detection frame structure to detect variations in the light intrusion plane, such as when an object (e.g., particulate matter, insects, pests, machinery, a human, etc.) is passing through the light intrusion plane.

In some embodiments, the controller unit can determine whether an object is passing through one or more light intrusion planes, and if so, can turn off (and/or decrease the power of) the laser emission plane. This can help ensure that objects (e.g., a human body) is not subjected to the laser emission plane. The laser filter system can be configured such that a separate distance is created between the laser filter frame structure and the one or more light intrusion planes. In some embodiments, the controller unit can instruct a position adjustment unit to alter and/or vary (e.g., via electrical and/or mechanical paths discussed below) the separation distance such that some objects (e.g., pests, insects, flies, bugs, etc.) can pass across one of the light instruction planes without crossing another light intrusion plane. When these smaller objects (e.g., insects, dust, bugs, etc.) are between the light intrusion planes, the controller unit can reactivate and/or energize the laser emission plane using a filtering beam power that will effectively vaporize, neutralize, immobilize, and/or reduce the object's structure, thereby providing environmental filtering. In some embodiments, the laser filter system can have a failsafe process such that if the controller unit is unsure whether a human has crossed one of the light intrusion planes, the controller unit can deactivate the laser emission plane for a defined time period. Once the controller unit confirms that the object has moved through each of the active light intrusion planes, the controller unit can reactive the laser emission plane.

In various embodiments, the laser filter system can allow for large environmental passages (e.g., windows, doors, hallways, and/or other passage thresholds) and/or open space environments (e.g., within an operating room, public transportation areas such as train station terminals, public gathering spaces, sporting event corridors, patios, outdoor stages, etc.) to receive filtration protection from biological and/or particulate matter without impeding either the air flow or free travel through the laser filter system. In some embodiments, the laser filter system can reside within mechanical and/or electrical devices, such as set-top boxes, network equipment cabinets, user equipment housings, a threshold of a room, a computer housing, a threshold of a passageway, security vaults, underground tunnels, pipes, data centers, and/or anywhere the (re)placement of a conventional filter is unfeasible (e.g., due to size and/or scale of deployment of a conventional filter). These and other aspects of the concepts and technologies disclosed herein will be illustrated and described in more detail below.

While some of the subject matter described herein may occasionally be presented in the general context of program modules that execute in conjunction with the execution of an operating system and/or application programs on a computer system (e.g., a controller unit), those skilled in the art will recognize that other implementations may be performed in combination with other types of program modules. Generally, program modules include routines, programs, components, data structures, and other types of structures that perform particular tasks or implement particular abstract data types in response to execution on a processor. Moreover, those skilled in the art will appreciate that at least some of the subject matter described herein may be practiced with other computer system configurations, including remote computing devices, multiprocessor systems, microprocessor-based or programmable consumer electronics, minicomputers, mainframe computers, and other particularized, non-generic machines.

Referring now to FIG. 1, aspects of a laser filter system 100 for providing environmental filtration with intrusion protection will be described, according to the illustrative embodiments. The laser filter system 100 shown in FIG. 1 can include a controller unit 102, a position adjustment unit 120, a laser filter frame structure 138, and one or more intrusion detection frame structures, such as a first intrusion detection frame structure 152 and a second intrusion detection frame structure 172. In some embodiments, the laser filter system 100 can include a first plurality of intrusion detection frame structures 150 and a second plurality of intrusion detection frame structures 170. The first plurality of intrusion detection frame structures 150 can include two or more instances of the first intrusion detection frame structure 152. The second plurality of intrusion detection frame structures 170 can include two or more instances of the second intrusion detection frame structure 172. The laser filter system 100 also can include one or more communication paths, such as the communication path 1 and the communication path 2. The communication path 1 can communicatively couple the controller unit 102 to one or more of the laser filter frame structure 138, the first intrusion detection frame structure 152, the first plurality of intrusion detection frame structures 150, the second intrusion detection frame structure 172, and/or the second plurality of intrusion detection frame structures 170. In some embodiments, the communication path 1 also can provide electrical coupling in order to power one or more of the elements of the laser filter system 100. The communication path 2 can communicatively couple the controller unit 102 to the position adjustment unit 120. In some embodiments, the laser filter system 100 also can include a separation adjustment path 3 that electrically and/or mechanically couples the position adjustment unit 120 with one or more intrusion detection plane of the first plurality of intrusion detection frame structures 150 and/or the second plurality of intrusion detection frame structures 170. It is understood that use and/or reference to the terms "first," "second," and/or other number should not be construed to imply an order, hierarchy, preference, and/or status.

In some embodiments, the laser filter frame structure 138 can include one or more structural members that can form a frame or perimeter that surrounds a laser emission plane 146. For example, the laser filter frame structure 138 illustrated in FIG. 1 shows four structural members in a rectangular shape; however, it is understood that this may not be the case in all embodiments. In some embodiments, the structural members of the laser filter frame structure 138 can take the form of an elongated beam, a channel, a rod, a plate, a flexible connector, or any combination thereof. At least two of the structural members of the laser filter frame structure 138 can extend vertically and/or horizontally, and may face each other. The laser filter frame structure 138 can include a laser emitter 140, a beam reflector 144, and a laser detector 148. In some embodiments, the laser filter frame structure 138 can include two or more of the laser emitter 140, the beam reflector 144, and/or the laser detector 148. In some embodiments, the laser emitter 140, the beam reflector 144, and/or the laser detector 148 can be mounted, affixed, or otherwise attached to one or more structural members of the laser filter frame structure 138. The laser emitter 140 can be configured to project at least one laser beam 142 that forms the laser emission plane 146. Although the embodiment of FIG. 1 shows the laser filter frame structure 138 to be substantially vertical, in some embodiments, the laser filter frame structure 138, along with the laser emission plane 146, can be configured in various positions. In some embodiments, the laser filter frame structure 138 can have multiple instances of the laser emitter 140 that are positioned so as to form an array of laser beams 142. In some embodiments, the laser filter frame structure 138 can position the beam reflectors 144 within a channel and/or groove of a structural member such that the beam reflectors 144 reflect the laser beam(s) 142 to form a laser emission plane. The positioning of the laser emitter 140 and the one or more beam reflectors 144 can avoid the creation of an angle of incidence, thereby maintaining the laser beam(s) 142 within a defined area and creating the laser emission plane 146. In some embodiments, the beam reflectors 144 can be positioned in one or more (or all) areas of the laser filter frame structure 138 that are not occupied by the laser emitter 140 and/or the laser detector 148.

In some embodiments, the laser emitter 140 can be powered by a power supply 112 of the controller unit 102. In some embodiments, the power supply 112 can provide various power levels so that the laser emitter 140 can create the laser emission plane 146 with various power intensities. For example, in some embodiments, the power supply 112 can provide the laser emitter 140 with a passive beam power 114 and/or a filtering beam power 116. In some embodiments, the passive beam power 114 of the laser emitter 140 can be a defined power level that is measured in milliwatts, such as at least five milliwatts. In some embodiments, the laser emitter 140 can be an ultraviolet laser emitter that is configured to provide ultraviolet (UV) light (i.e., light having a wavelength shorter than 400 nanometers). In some embodiments, the filtering beam power 116 is higher (i.e., greater) than the passive beam power 114. For example, in some embodiments, the passive beam power 114 can be set between 5 milliwatts and 10 milliwatts and cause the laser emitter 140 to create the laser emission plane 146. When the filtering beam power 116 is provided to the laser emitter 140, the laser emission plane 146 can be created using in excess of 10 milliwatts, such as 100 milliwatts, 1 watt, and/or up to 10 watts.

In some embodiments, the laser emitter 140 can be configured to emit the laser beam 142 within one or more of a UV-A range (e.g., from 320-400 nanometer), a UV-B range (e.g., from 280-320 nanometers), and/or a UV-C range (e.g., 200-280 nanometers). In some embodiments, the laser emitter 140 can be configured to emit the laser beam 142 (and thus create the laser emission plane 146) at an intermediate UV range that does not correspond with the UV-A, UV-B, and/or UV-C ranges above. For example, the intermediate UV range can correspond with wavelengths from 281-315 nanometers. In some instances, UV light at certain wavelengths (e.g., corresponding to the UV-C range) can have the potential to interact with trace hydrocarbons in the air that passes through the laser filter frame structure 138, which in turn can have the potential to lead to the deposition of organic films on nearby surfaces. Therefore, in some embodiments, one or more of the laser emitters 140 can be configured to create the laser emission plane 146 using the intermediate UV range (i.e., from 281-315 nanometers) so as to induce excitation of the bonds of an object (e.g., one or more of the objects 132, 134, and/or 136). The excitation of the bonds can lead to changes in the chemical structure (e.g., breaking of bonds, thereby sterilizing, neutralizing, immobilizing, and/or vaporizing) of at least a portion of the object subjected to the laser emission plane 146. In some embodiments, the laser detector 148 can detect whether the laser emission plane 146 is activated, and in some embodiments, can detect a wavelength and/or power intensity at which the laser emitter 140 providing the laser beam 142 of the laser emission plane 146 is operating. In some embodiments, the laser filter frame structure 138 can report, to the controller unit 102 along the communication path 1, whether the laser emission plane 146 is active (i.e., the laser emitter 140 has been activated to provide the laser beam 142), the wavelength at which the laser beam 142 is being emitted, and/or the power intensity. In some embodiments, the information reported to the controller unit 102 can be provided in an activation and detection message 194.

In some embodiments, the laser filter frame structure 138 can be disposed between the first plurality of intrusion detection frame structures 150 and the second plurality of intrusion detection frame structures 170. As illustrated in FIG. 1, the first plurality of intrusion detection frame structures 150 is shown to include three instances of an intrusion detection frame structure, such as the intrusion detection frame structures 152, 164, and 166; however, this may not be the case in all embodiments. In some embodiments, less than three or more than three instances of an intrusion detection frame structure can be provided. Similarly, FIG. 1 shows the second plurality of intrusion detection frame structures 170 as including three instances of an intrusion detection frame structure, such as the intrusion detection frame structures 172, 184, and 186; however, it is understood that less than three or more than three instances of an intrusion detection frame structure can be provided. For clarity, only one instance from each of the first plurality of intrusion detection frame structures 150 and the second plurality of intrusion detection frame structures 170 will be described.

In some embodiments, the intrusion detection frame structure 152 may be referred to as the "first intrusion detection frame structure," and may reside as one of the outer-most intrusion detection frame structures of the first plurality of intrusion detection frame structures 150 of the laser filter system 100. The intrusion detection frame structure 152 can include a photon emitter 154, a reflective surface 156, and a photon detector 158. The photon emitter 154 can be configured to emit a light beam 160 that, upon being reflected from one or more reflective surfaces 156, creates a light intrusion plane 162. In some embodiments, two or more photon emitters 154 can be positioned in an array along a structural member of the intrusion detection frame structure 152. In some embodiments, the photon emitter 154 can emit infrared light such that the light intrusion plane 162 includes one or more beams of infrared light. In some embodiments, the photon emitter 154 can include a light-emitting diode (LED) that can emit pulses of infrared light in response to being activated by the controller unit 102. Each photon emitter 154 of the intrusion detection frame structure 152 can be located in a channel or groove so as to avoid the creation of an angle of incidence, and therefore allow the light intrusion plane 162 to be continuous. This can ensure that the light intrusion plane 162 remains within an edge of the intrusion detection frame structure 152. Moreover, the channel or groove can allow for multiple instances of the intrusion detection frame structure to be located next to each other without each respective light intrusion plane conflicting with each other (e.g., the intrusion detection frame structures 152, 164, and 166). In some embodiments, the photon detector 158 can be configured to detect the light beam 160 from the light intrusion plane 162. Specifically, the photon detector 158 can measure the light intensity of the light intrusion plane 162 and report the light intrusion plane measurements to the controller unit 102, such as via the communication path 1. In some embodiments, when an object (e.g., any of the objects 130, 132, 134, and/or 136) passes across and/or through the light intrusion plane 162, the photon detector 158 detects and/or measures a decrease in the amount of light from the light intrusion plane 162 (e.g., measured in "lux," which corresponds with luminous flux per unit for measuring light intensity). The measurements from the photon detector 158 (referred to as light intrusion plane measurements) can be used by the controller unit 102 to determine whether an object is crossing through the light intrusion plane 162, and if so, can approximate the size of the object, and amount of intrusion, and whether the object has passed through the light intrusion plane 162. In some embodiments, the light intrusion plane measurements can be sent to the controller unit 102 in the activation and detection message 194. The intrusion detection frame structures 164, 166 can be configured substantially similar to the intrusion detection frame structure 152 described above.

In some embodiments, the intrusion detection frame structure 172 may be referred to as the "second intrusion detection frame structure," and may reside as one of the outer-most intrusion detection frame structures of the second plurality of intrusion detection frame structures 170 of the laser filter system 100. The intrusion detection frame structure 172 can include a photon emitter 174, a reflective surface 176, and a photon detector 178. The photon emitter 174 can be configured to emit a light beam 180 that, upon being reflected from one or more reflective surfaces 176, creates a light intrusion plane 182. In some embodiments, two or more photon emitters 174 can be positioned in an array along a structural member of the intrusion detection frame structure 172. In some embodiments, the photon emitter 174 can emit infrared light such that the light intrusion plane 182 includes one or more beams of infrared light. In some embodiments, the photon emitter 174 can include a light-emitting diode (LED) that can emit pulses of infrared light in response to being activated by the controller unit 102. Each photon emitter 174 of the intrusion detection frame structure 172 can be located in a channel or groove so as to avoid the creation of an angle of incidence, and therefore allow the light intrusion plane 182 to be continuous. This can ensure that the light intrusion plane 182 remains within an edge of the intrusion detection frame structure 172. Moreover, the channel or groove can allow for multiple instances of the intrusion detection frame structure to be located next to each other without each respective light intrusion plane conflicting with each other (e.g., the intrusion detection frame structures 172, 184, and 186). In some embodiments, the photon detector 178 can be configured to detect the light beam 180 from the light intrusion plane 182. Specifically, the photon detector 178 can measure the light intensity of the light intrusion plane 182 and report the light intrusion plane measurements to the controller unit 102, such as via the communication path 1. In some embodiments, when an object (e.g., any of the objects 130, 132, 134, and/or 136) passes across and/or through the light intrusion plane 182, the photon detector 178 detects and/or measures a decrease in the amount of light from the light intrusion plane 182 (e.g., measured in "lux," which corresponds with luminous flux per unit for measuring light intensity). The measurements from the photon detector 178 (referred to as light intrusion plane measurements) can be used by the controller unit 102 to determine whether an object is crossing through the light intrusion plane 182, and if so, can approximate the size of the object, amount of intrusion, and whether the object has passed through the light intrusion plane 182. In some embodiments, the light intrusion plane measurements can be sent to the controller unit 102 in the activation and detection message 194. The intrusion detection frame structures 184, 186 can be configured substantially similar to the intrusion detection frame structure 172 described above.

The laser filter frame structure 138 can be located in between the first plurality of intrusion detection frame structures 150 and the second plurality of intrusion detection frame structures 170. As illustrated in FIG. 1, each of the first plurality of intrusion detection frame structures 150 and the second plurality of intrusion detection frame structures 170 can be offset and/or otherwise separated from the laser filter frame structure 138. In some embodiments, the distance which each of the intrusion detection frame structures is separated from the laser filter frame structure 138 can be referred to as a separation distance, such as the separation distances 190, 192. In some embodiments, the laser filter frame structure 138 can be an anchor point by which to measure the gap created between the laser filter frame structure 138 and the intrusion detection frame structures. For example, in the embodiment shown in FIG. 1, the first plurality of intrusion detection frame structures 150 can have three intrusion detection frame structures 152, 164, and 166, and each can correspond with the separation distances 190A, 190B, and 190C, respectively (collectively 190) relative to the laser filter frame structure 138. Similarly, the second plurality of intrusion detection frame structures 170 can have three intrusion detection frame structures 172, 184, and 186, and each can correspond with the separation distances 192A, 192B, and 192C, respectively (collectively 192) relative to the laser filter frame structure 138. In some embodiments, the separation distances 190A, 190B, 190C, 192A, 192B, 192C indicate the respective distances from the laser emission plane 146 to a light intrusion plane created by the intrusion detection frame structures 152, 164, 166, 172, 184, and 186, respectively. In some embodiments, the distance between the laser emission plane 146 and a closest active light intrusion plane can correspond with at least one of the separation distances 190A, 190B, 190C, 192A, 192B, 192C.

In some embodiments, the position adjustment unit 120 can be configured to increase or decrease the separation distance formed between the laser emission plane 146 of the laser filter frame structure 138 and at least one of the light intrusion planes (e.g., any of the light intrusion planes of the intrusion detection frame structures 152, 164, 166, 172, 184, and/or 186). In some embodiments, the position adjustment unit 120 can provide the separation adjustment path 3 that can be used to mechanically vary one or more of the intrusion detection frame structures 150, 170. For example, in some embodiments, the separation adjustment path 3 can include one or more rack and pinion mechanisms that can allow one or more of the intrusion detection frame structures to move closer to the laser filter frame structure 138 (thereby decreasing one or more of the separation distances 190, 192) and/or further away from the laser filter frame structure 138 (thereby increasing one or more of the separation distances 190, 192). In some embodiments, the separation adjustment path 3 is mechanically and/or electrically coupled to the position adjustment unit 120. In some embodiments, the position adjustment unit 120 can include an adjustment circuit 122, one or more communication components 124, and a set of adjustment gearing 126. The adjustment circuit 122 can be configured to include a processor and a memory that can receive one or more adjustment commands in an adjustment message 198 from the controller unit 102 via the communication path 2. The adjustment message 198 can instruct the position adjustment unit 120 to use the adjustment gearing 126 to actuate one or more of the intrusion detection frame structures 150, 170 so as to move one or more of the instruction detection frame structures 150, 170 closer to or farther away from the laser filter frame structure 138. In some embodiments, the position adjustment unit 120 can be attached to the laser filter frame structure 138. It is understood that, in some embodiments, the position adjustment unit 120 is optional and the separation distances 190, 192 can be varied based on activation and/or deactivation of a particular intrusion detection frame structure (e.g., one or more of the intrusion detection frame structures 150, 170).

For example, in some embodiments, the controller unit 102 can adjust a separation distance formed between the laser emission plane 146 and the first plurality of light intrusion planes by deactivating at least one light intrusion plane of the first plurality of intrusion detection frame structures 150 (e.g., deactivating the light intrusion planes for one or more of intrusion detection frame structure 164 and/or 166) while maintaining activation of the remaining intrusion planes of the first plurality of intrusion detection frame structures 150 (e.g., maintaining the light intrusion plane 162 of the intrusion detection frame structure 152).

It is understood that the separation distances 190A, 190B, 190C, 192A, 192B, and 192C shown in FIG. 1 are not drawn to scale, and therefore the actual distances can correspond with various lengths. For example, in some embodiments, one or more of the separation distances 190A, 190B, 190C, 192A, 192B, and 192C can vary (and/or be adjusted) from one millimeter to multiple millimeters (e.g., from one millimeter to one hundred millimeters). As shown in FIG. 1, the object 130 corresponds with a human, the object 132 correspond with a pest (e.g., a rodent), the object 134 corresponds with an insect (e.g., a bug), and the object 136 corresponds with particulate matter (e.g., dust). It is understood that the examples are provided for illustration purposes only, and therefore should not be construed as limiting in any way. The size of the objects 130, 132, 134, and 136 shown in FIG. 1 are not illustrated to scale, and therefore may vary. In some embodiments, the object 130 may be able to obstruct the light intrusion plane for each of the first plurality of intrusion detection frame structures 150 and/or the light intrusion plane for each of the second plurality of intrusion detection frame structures 170. Comparatively, the objects 132, 134, and/or 136 may be small enough to temporarily obstruct and pass through one of the light intrusion planes 162, 182 without obstructing or passing through another of the intrusion detection frame structures 150, 170. For example, the object 134 may pass through the light intrusion plane 182 and be located within the separation distance 192C, but the object 134 is positioned such that it is not obstructing and/or passing through at least one of the light intrusion planes of the first plurality of intrusion detection frame structures 150.

The laser filter system also can include the controller unit 102. The controller unit 102 can include a processor 104, a memory 108, communication components 106, and the power supply 112. The memory 108 can store a filter controller application ("filter controller") 110. The filter controller 110 can be configured to activate the laser emitter 140 of the laser filter frame structure 138 to create the laser emission plane 146. The filter controller 110 can receive the activation and detection message 194 sent from one or more of the intrusion detection frame structures 150, 170. The filter controller 110 can analyze the measurements from the activation and detection message 194 to detect and/or determine whether an object (e.g., any of the objects 130, 132, 134, 136) is obstructing or otherwise passing through one of the light intrusion planes of the intrusion detection frame structures 150, 170. For example, the filter controller 110 can compare the measurements from the activation and detection message 194 to determine whether one of the photon detectors (e.g., one of the photon detectors 158, 178) is detecting an object passing through one of the light intrusion planes 162, 182 based on whether the one or more of the photon detectors 158, 178 receives an amount of light from the light intrusion planes 162, 182 that is less than an average amount of light (e.g., an average light value measured in lux, which is a standard light intensity unit) typically detected by the photon detectors 158, 178 for each of the light intrusion planes 162, 182. If the amount of light is less than the average, the filter controller 110 can determine that an object (e.g., any of the objects 130, 132, 134, 136) is passing through a light intrusion plane (e.g., the first light intrusion plane 162). If the amount of light is the same or more than the average amount of light, then the controller unit 102 will determine that an object has not and/or is no longer passing through the particular light intrusion plane. In some embodiments, the laser emission plane 146 may be energized at the passive beam power 114. If an object is detected, the filter controller 110 can create and send filtering commands 196 to the laser filter frame structure 138 to instruct the laser emitter 140 to deactivate (i.e., power down or otherwise turn off) in order to pause creation of the laser emission plane 146. The intrusion detection frame structures 150, 170 may continue to send light measurements from the photon detectors 158, 178. The filter controller 110 may continue to check the light measurements while the laser emitter 140 is deactivated in order to determine whether the object has passed through the particular light intrusion plane that detected the obstruction (e.g., the first light intrusion plane 162). In an embodiment, the object 132 may have passed through the light intrusion plane 162, but not yet passed through one of the light intrusion planes of the second plurality of intrusion detection frame structures 170. In this embodiment, the filter controller 110 can reactivate the laser emitter 140 of the laser filter frame structure 138 to create the laser emission plane 146. In some embodiments, the laser emission plane 146 may be reactivated at the filtering beam power 116 prior to the object 132 passing through the second light intrusion plane 182, thereby causing the object 132 to be subjected to the laser emission plane 146 at the filtering beam power 116. This can cause the object 132 to be immobilized, sterilized, vaporized, and/or otherwise filtered.

It is understood that zero, one, or more than one instance of the communication path 1; the communication path 2; the separation adjustment path 3; the plurality of intrusion detection frame structures 150; the intrusion detection frame structures 152, 164, 166; the photon emitter 154; the reflective surface 156; the photon detector 158; the light beam 160; the light intrusion plane 162; the second plurality of intrusion detection frame structures 170; the intrusion detection frame structures 172, 184, 186; the photon emitter 174; the reflective surface 176; the photon detector 178; the light beam 180; the light intrusion plane 182; the laser filter frame structure 138; the laser emitter 140; the laser emission plane 146; the laser beam 142; the beam reflectors 144; the laser detector 148; the controller unit 102; the processor 104; the memory 108; the communication components 106; the filter controller 110; the power supply 112; the passive beam power 114; the filtering beam power 116; the position adjustment unit 120; the adjustment circuit 122; the communication components 124; the adjustment gearing 126; the separation distances 190A, 190B, 190C; the separation distances 192A, 192B, 192C; the objects 130, 132, 134, 136; the activation and detection message 194; the filtering commands 196; and the adjustment message 198 can be included within the laser filter system 100. It is understood that the examples are for illustration purposes only and should not be construed as limiting in any way.

Figure 2:
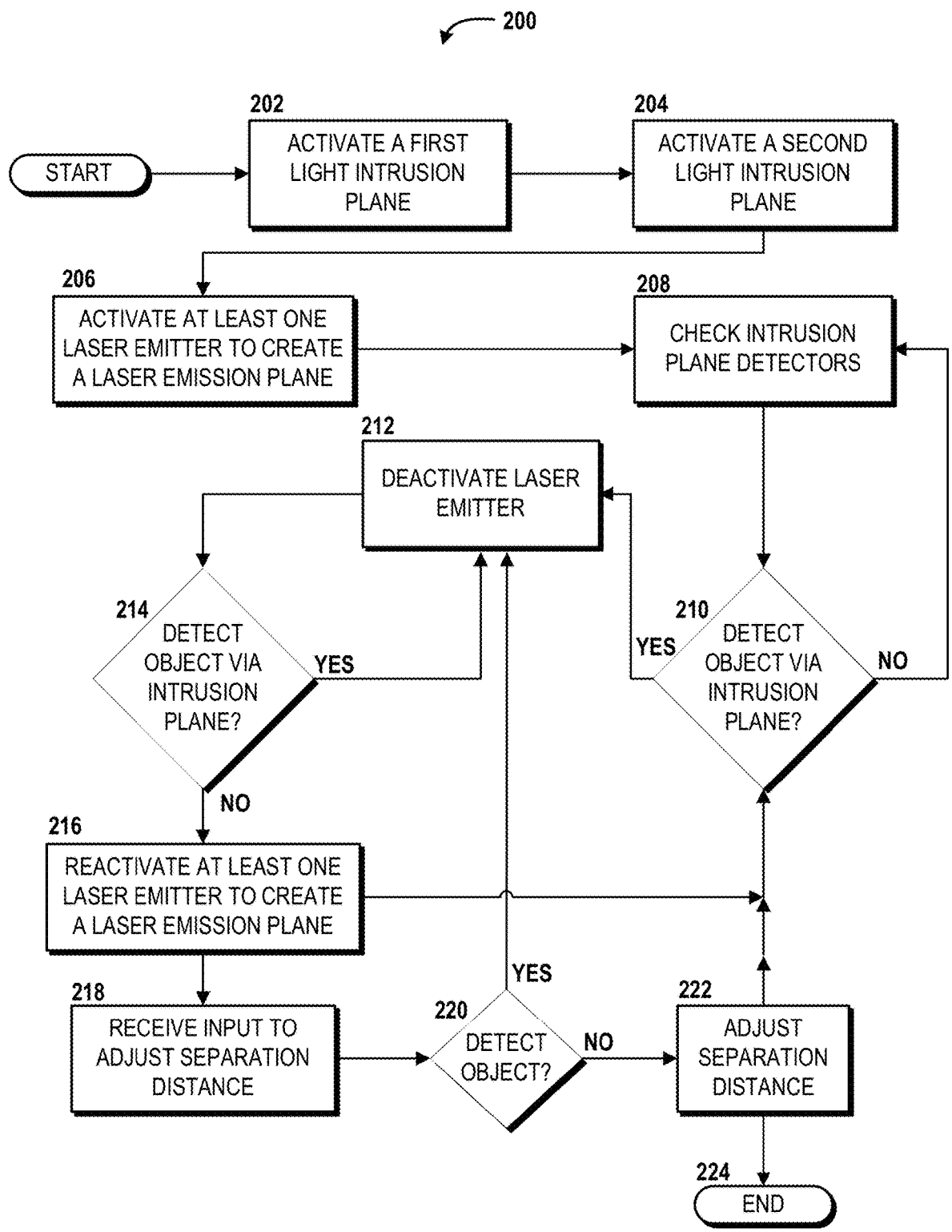
FIG. 2 is a flow diagram showing aspects of a method for providing environmental filtering with filter intrusion protection, according to an illustrative embodiment of the concepts and technologies described herein.

Turning now to FIG. 2, aspects of a method 200 for providing optical environmental filtering with intrusion protection, such as via use of a laser filter system 100, will be described in detail, according to an illustrative embodiment. It should be understood that the operations of the method 200 disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the controller unit 102, to perform one or more operations and/or causing the processor to direct other components of the computing system and/or of the laser filter system (e.g., one or more laser emitter) to perform one or more of the operations.

For purposes of illustrating and describing the concepts of the present disclosure, the methods disclosed herein are described as being performed by the laser filter system 100 via execution of one or more computer executable software modules such as, for example, the filter controller 110 that configure one or more processors. It should be understood that additional and/or alternative devices and/or components can be used to provide at least some of the functionality described herein via execution of one or more modules, applications, processor, and/or instructions including, but not limited to, the adjustment message 198, the filtering commands 196, and/or the activation and detection message 194. Thus, the illustrated embodiments are illustrative, and should not be viewed as being limiting in any way.

The method 200 begins at operation 202, where the controller unit 102 can activate a first light intrusion plane, such as the light intrusion plane 162 of the intrusion detection frame structure 152. In some embodiments, the controller unit 102 can send an activation command along the communication path 1, where the activation command instructs the photon emitter 154 to create the light intrusion plane 162. From operation 202, the method 200 proceeds to operation 204, where the controller unit 102 can activate a second light intrusion plane, such as the light intrusion plane 182 of the intrusion detection frame structure 172. In some embodiments, the controller unit 102 can send an activation command along the communication path 1, where the activation command instructs the photon emitter 174 to create the light intrusion plane 182. From operation 204, the method 200 proceeds to operation 206, where the controller unit 102 can instruct the laser filter frame structure 138 to activate one or more laser emitter, such as the laser emitter(s) 140, to create the laser emission plane 146. In some embodiments, the laser emitter 140 can be configured to create the laser emission plane 146 by using the passive beam power 114. In some embodiments, the passive beam power 114 can be at least five milliwatts. In some embodiments, the passive beam power 114 can be configured to neutralize small particulate matter, such as the objects 136 that are embodied as dust, smoke, or other air-borne contaminates.

From operation 206, the method 200 proceeds to operation 208, where one or more of the photon detectors, such as the photon detectors 158, 178, can provide light measurements to the controller unit 102, such as via an activation and detection message 194. The light measurements can correspond with a measurement of an amount of light that is being detected from the light intrusion planes, such as the light intrusion planes 162, 182. The controller unit 102 can receive the light measurements and compare them with an average amount of light for each of the light intrusion planes 162, 182.

From operation 208, the method 200 proceeds to operation 210, where the controller unit 102 can compare the measurements from the activation and detection message 194 to determine whether one of the photon detectors (e.g., one of the photon detectors 158, 178) is detecting an object passing through one or more of the light intrusion planes. The controller unit 102 can determine, via the light measurements, that the light from one or more of the light intrusion planes 162, 182 is less than the average amount of light typically detected by photon detectors 158, 178 for each of the light intrusion planes 162, 182. If the amount of light is the same as and/or greater than the average amount of light that is detected for a particular light intrusion plane, then the method 200 can proceed along the NO path and return to the operation 208. However, if the controller unit 102 determines that the amount of light is less than the average amount of light for the particular light intrusion plane, the filter controller 110 can determine that an object (e.g., any of the objects 130, 132, 134, 136) is passing through that light intrusion plane (e.g., the first light intrusion plane 162). This can cause the method 200 to proceeds along the YES path to operation 212.

At operation 212, the controller unit 102 can deactivate the laser emitter 140 of the laser filter frame structure 138, thereby pausing and/or ceasing creation of the laser emission plane 146. In some embodiments, the laser emitter 140 ceases emission of the laser beam 142 for as long as an object is detected and continues to obstruct one or more of the light intrusion planes, such as from any of the plurality of intrusion detection frame structures 150, 170. For example, the object 130 may be sufficiently large enough in size such that one or more (or each) of the light intrusion planes is obstructed in the first plurality of intrusion detection frame structures 150 and/or one or more of the light intrusion planes is obstructed in the second plurality of intrusion frame structures 170 as the object 130 passes through the laser filter system 100. The laser emitter 140 will be deactivated, thereby ensuring that the object 130 will not be subjected to the laser emission plane 146 while passing through the laser filter system 100.

From operation 212, the method 200 can proceed to operation 214, where the controller unit 102 can instruct one or more of the intrusion detection frame structures (e.g., any of the intrusion detection frame structures 150, 170) to provide light measurements and the controller unit 102 can detect whether an object continues to obstruct one or more of the light intrusion planes (e.g., any of the light intrusion planes 162, 182). If light measurements from the photon detectors 158, 178 continue to indicate that the amount of light detected is less than an average amount of light for the light intrusion planes, then the method 200 can proceed along the YES path and return to operation 212, where the controller unit 102 can continue to deactivate the laser emitter 140. If the controller unit 102 determines that none of the light measurements from the photon detectors (e.g., the photon detectors 158, 178) are less than an average amount of light for the light intrusion planes (e.g., the light intrusion planes 162, 182), then the method 200 can proceed along the NO path to operation 216.

At operation 216, the controller unit 102 can send a filtering command 196 to the laser filter frame structure 138 to reactivate at least one laser emitter, such as the laser emitter 140, to create the laser emission plane 146. In some embodiments, the laser emission plane 146 may be reactivated using a filtering beam power 116, where the filtering beam power 116 has a higher power output than the passive beam power 114. For example, the filtering beam power 116 can provide between 100 milliwatts to 1 kilowatt of power, thereby enabling filtration by immobilizing, vaporizing, sterilizing, and/or otherwise neutralizing an object, such the objects 132, 134, and/or 136 that is passing through the laser filter system 100. In some embodiments, the laser emitter 140 is reactivated to produce the laser beam 142 at the intermediate UV range, thereby enabling the laser emission plane 146 to immobilize and/or vaporize the objects 132, 134, and/or 136. In some embodiments, this can ensure that an environment associated with the laser filter system 100 remains sterile and/or has a reduced number of contaminants, without similarly impacting a human, such as the object 130, passing through the laser filter system 100. In some embodiments, the method 200 can proceed back to operation 210, where the operations can continue to occur in a loop. In some embodiments, the method 200 can proceed from operation 216 to operation 218.

At operation 218, the controller unit 102 can receive an input that directs the laser filter system 100 to adjust the separation distance formed between the laser emission plane 146 of the laser filter frame structure 138 and a light intrusion plane that is created by one of the intrusion detection frame structures 150, 170 (such as the closest light intrusion plane that is active and created by one of the intrusion detection frame structures 150, 170). For example, in some embodiments, separation distance can be adjusted by the position adjustment unit 120 moving one or more of the intrusion detection frame structures 150, 170 closer to, or farther away from, the laser filter frame structure 138. In other embodiments, the separation distance can be adjusted by activating and/or deactivating one of the light intrusion planes of the intrusion detection frame structures 150, 170. For example, in some embodiments, the intrusion detection frame structure 166 can be active and emitting a light intrusion plane. As such, in this example, the distance from the laser emission plane 146 to the closest light intrusion plane initially corresponds to the separation distance 190C because the closest active light intrusion plane is provided by the intrusion detection frame structure 166. In some embodiments where the position adjustment unit 120 is used, the separation distance from the laser emission plane 146 to the closest light intrusion plane (in this example the separation distance 190C) can be adjusted by the controller unit 102 instructing the position adjustment unit 120 to moving the intrusion detection frame structure 166 towards or away from the laser filter frame structure 138, thereby increasing and/or decreasing the separation distance 190C. In other embodiments, the separation distance from the laser emission plane 146 to the closest light intrusion plane (in this example the separation distance 190C) can be adjusted by the controller unit 102 instructing the intrusion detection frame structure 166 to deactivate (i.e., cease emission of a laser beam that creates a light intrusion plane), and activating a light intrusion plane of the intrusion detection frame structure 164, thereby causing the distance from the laser emission plane 146 to the closest active laser intrusion plane to correspond with separation distance 190B, which is an increase from the separation distance 190C. As another example, if the light intrusion plane 162 is activated and the laser intrusion plane of the intrusion detection frame structure 166 is deactivated, then the distance from the laser emission plane 146 to the closest active laser intrusion plane would correspond with separation distance 190A, which is also greater than the separation distance 190C. It is understood that one or more of the plurality of intrusion detection frame structures 170 may be moved, activated, and/or deactivated as discussed above with respect to one or more of the plurality of intrusion detection frame structures 150. It is understood that the use of the position adjustment unit 120 and a combination of activation and deactivation of light intrusion planes may be implemented to vary the distance between light intrusion planes and/or the distance between the laser emission plane and the closest light intrusion plane. As such, the examples discussed above are for illustration purposes only, and therefore should not be construed as limiting the scope of the disclosure in any way.

In some embodiments, the method 200 can proceed to operation 220. At operation 220, the controller unit 102 can determine whether an object is obstructing one or more of the light intrusion planes (e.g., the light intrusion planes corresponding to the intrusion detection frame structures 150, 170) prior to adjusting a separation distance. If an object is detected to be obstructing a light intrusion plane, the controller unit 102 may proceed along the YES path to operation 212, where the controller unit 102 can continue to deactivate the laser emitter 140 and cease and/or pause the laser emission plane 146. If the controller unit 102 determines that an object is not passing through or otherwise obstructing one or more of the light intrusion planes, the method 200 can proceed along the NO path to operation 222.

At operation 222, the control unit 102 can adjust a separation distance formed between the laser emission plane 146 and one or more of the light intrusion planes. For example, in some embodiments, the control unit 102 can send an adjustment message 198 to the position adjustment unit 120. The position adjustment unit 120 can adjust a separation distance 190A that separates the laser emission plane 146 from the first light intrusion plane 162. In some embodiments, the intrusion detection frame structure 152 can be adjusted toward and/or away from the laser emission plane 146, thereby increasing or decreasing the separation distance 190A. In some embodiments, the separation distance can correspond with the distance between the laser emission plane 146 and the closest active light intrusion plane. The separation distance can be adjusted by the controller unit 102 activating and/or deactivating one or more light intrusion planes of the intrusion detection frame structures 150, 170. For example, in an embodiment, only the light intrusion plane 162 may initially be active from amongst the first plurality of intrusion detection frame structures 150. The controller unit 102 can adjust the distance between the laser emission plane 146 and the closest active light intrusion plane (which initially corresponds with the separation distance 190A) by activating another light intrusion plane within the first plurality of intrusion detection frame structures 150 that is closer to the laser emission plane 146, such as by activating the photon emitter of the intrusion detection frame structure 166 (which in some embodiments may be referred to as a third intrusion detection frame structure of the first plurality of intrusion detection frame structures 150), where the intrusion detection frame structure 166 is located between the intrusion detection frame structure 152 and the laser filter frame structure 138. Thus, the separation distance between the laser emission plane and the closest active light intrusion plane (now the light intrusion plane of the intrusion detection frame structure 166) now corresponds with the separation distance 190C (which is less than the separation distance 190A), thereby effectively shortening the separation distance (between the laser emission plane and the closest active light intrusion plane) to correspond from 190A to 190C. In some embodiments, the controller unit 102 can deactivate the light intrusion plane 162 of the intrusion detection frame structure 152. It is understood that the examples discussed herein are for illustration purposes only, and therefore should not be construed as limiting in any way. In some embodiments, the method 200 can proceed from operation 222 back to operation 210. In some embodiments, from operation 222, the method 200 can proceed to operation 224. At operation 224, the method 200 ends.

Figure 3:
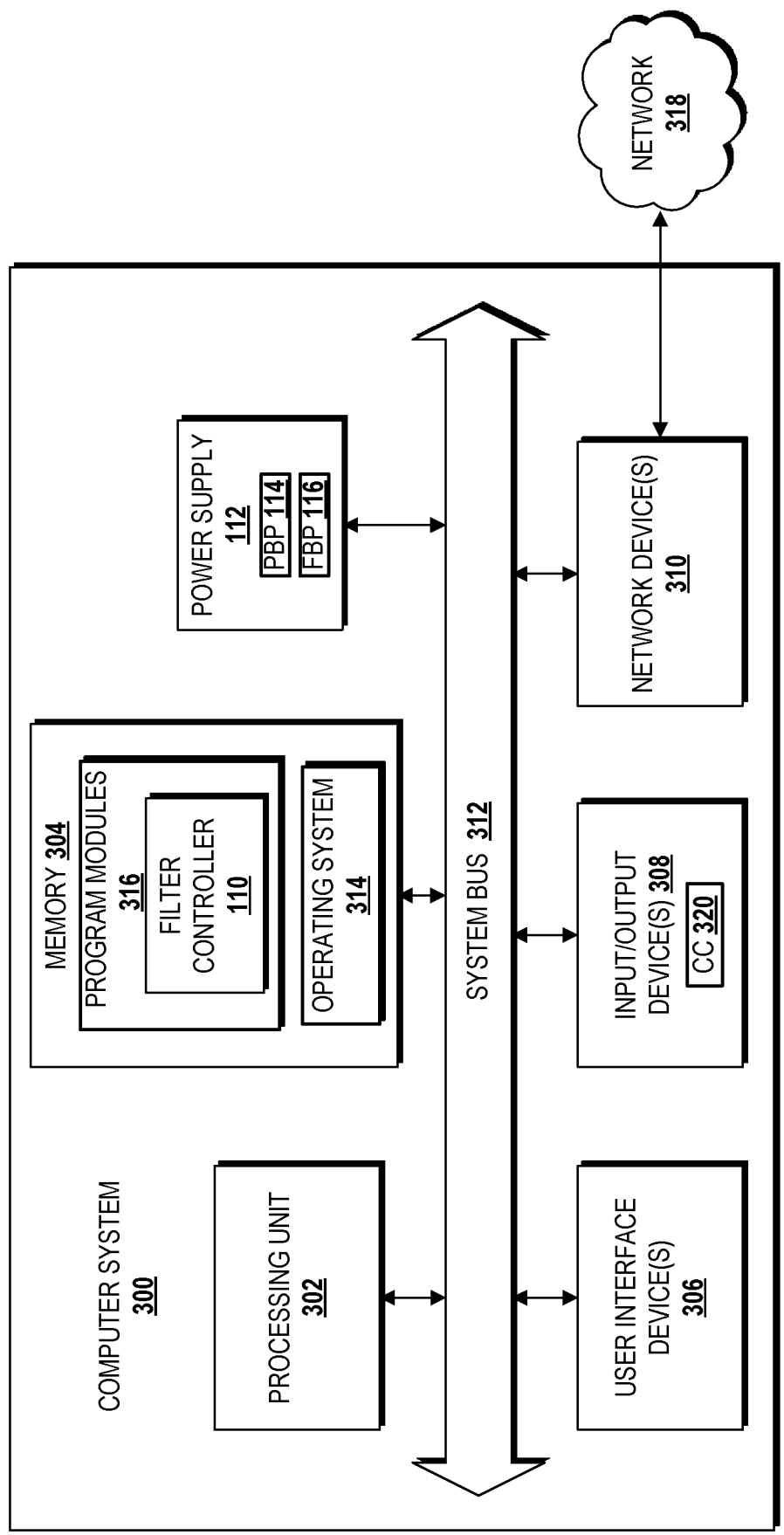
FIG. 3 is a block diagram illustrating an example computer system configured to be implemented in environmental filtering with intrusion protection, according to some illustrative embodiments of the concepts and technologies described herein.

FIG. 3 is a block diagram illustrating a computer system 300 configured to provide at least some of the functionality and operations described herein for providing environmental filtering with intrusion protection, in accordance with various embodiments of the concepts and technologies disclosed herein. In some aspects, the controller unit 102 illustrated and described herein can be configured as and/or can have an architecture similar or identical to the computer system 300. In some embodiments, the position adjustment unit 120 can be configured to have an architecture that includes the computer system 300. The computer system 300 includes a processing unit 302, a memory 304, one or more user interface devices 306, one or more input/output ("I/O") devices 308, and one or more network devices 310, each of which is operatively connected to a system bus 312. The system bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 304 communicates with the processing unit 302 via the system bus 312. In some embodiments, the memory 304 is operatively connected to a memory controller (not shown) that enables communication with the processing unit 302 via the system bus 312. The memory 304 includes an operating system 314 and one or more program modules 316. The operating system 314 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 316 may include various software and/or program modules described herein. In some embodiments, for example, the program modules 316 include the filter controller application 110 and/or other program modules. These and/or other programs can be embodied in computer-readable media containing instructions that, when executed by the processing unit 302, can facilitate performance of the method 200 described in detail above with respect to FIG. 2. According to some embodiments, the program modules 316 may be embodied in hardware, software, firmware, or any combination thereof. Although not shown in FIG. 3, it should be understood that the memory 304 also can be configured to store measurements, values, commands, and/or instructions from one or more of the activation and detection message 194, the filtering commands 196, the adjustment message 198, and/or other data, if desired.

By way of example, and not limitation, computer-readable media may include any available computer storage media or communication media that can be accessed by the computer system 300. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300. In the claims, the phrase "computer storage medium" and variations thereof does not include waves or signals per se and/or communication media.

The user interface devices 306 may include one or more devices with which a user accesses the computer system 300. The user interface devices 306 may include, but are not limited to, computers, servers, personal digital assistants, cellular phones, or any suitable computing devices. The I/O devices 308 enable a user to interface with the program modules 316. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display screen or a printer.

The network devices 310 enable the computer system 300 to communicate with other networks or remote systems via a network, such as the network 318. Examples of the network devices 310 include, but are not limited to, a modem, a radio frequency ("RF") or infrared ("IR") transceiver, a telephonic interface, a bridge, a router, or a network card. The network 318 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 318 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

The I/O devices 308 can include communications components 320. The communication components 106 and 124 can be configured substantially similar to the communications components 320. The communications component 320 can be configured to interface with the processing unit 302 to facilitate wired and/or wireless communications with one or more networks such as the network 318 described herein. In some embodiments, other networks include networks that utilize non-cellular wireless technologies such as WI-FI or WIMAX. In some embodiments, the communications component 320 includes a multimode communications subsystem for facilitating communications via the cellular network and one or more other networks.

The communications component 320, in some embodiments, includes one or more transceivers. The one or more transceivers, if included, can be configured to communicate over the same and/or different wireless technology standards with respect to one another. For example, in some embodiments one or more of the transceivers of the communications component 320 may be configured to communicate using GSM, CDMAONE, CDMA2000, LTE, and various other 2G, 2.5G, 3G, 4G, and greater generation technology standards. Moreover, the communications component 320 may facilitate communications over various channel access methods (which may or may not be used by the aforementioned standards) including, but not limited to, TDMA, FDMA, W-CDMA, OFDM, SDMA, and the like.

In addition, the communications component 320 may facilitate data communications using GPRS, EDGE, the HSPA protocol family including HSDPA, EUL or otherwise termed HSUPA, HSPA+, and various other current and future wireless data access standards. In the illustrated embodiment, the communications component 320 can include a first transceiver ("TxRx") that can operate in a first communications mode (e.g., GSM). The communications component 320 also can include an N$^{th}$ transceiver ("TxRx") that can operate in a second communications mode relative to the first transceiver (e.g., UMTS). It should be appreciated that less than two, two, and/or more than two transceivers can be included in the communications component 320.

The communications component 320 also can include an alternative transceiver ("Alt TxRx") for supporting other types and/or standards of communications. According to various contemplated embodiments, the alternative transceiver can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 320 also can facilitate reception from terrestrial radio networks, digital satellite radio networks, internet-based radio service networks, combinations thereof, and the like. The communications component 320 can process data from a network such as the Internet, an intranet, a broadband network, a WI-FI hotspot, an Internet service provider ("ISP"), a digital subscriber line ("DSL") provider, a broadband provider, combinations thereof, or the like.

The illustrated computer system 300 also can include a power supply, such as the power supply 112 discussed with regards to the controller unit 102. The power supply 112 can include one or more batteries, power supplies, power cells, and/or other power subsystems including alternating current ("AC") and/or direct current ("DC") power devices. The power supply 112 also can interface with an external power system or charging equipment via a power I/O component. The power supply 112 can provide power in various strengths, such as the passive beam power 114 and/or the filtering beam power 116. In some embodiments, the passive beam power 114 and/or the filtering beam power 116 can be provided to the laser filter system 100 via the I/O devices 308. Because the computer system 300 can include additional and/or alternative components, the above embodiment should be understood as being illustrative of one possible operating environment for various embodiments of the concepts and technologies described herein. The described embodiment of the computer system 300 is illustrative, and should not be construed as being limiting in any way.

Based on the foregoing, it should be appreciated that systems and methods for providing environmental filtering with intrusion protection have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A laser filter system comprising:
a first intrusion detection frame structure that forms a first light intrusion plane;
a second intrusion detection frame structure that forms a second light intrusion plane;
a laser filter frame structure that is disposed between the first intrusion detection frame structure and the second intrusion detection frame structure, wherein the laser filter frame structure comprises at least one laser emitter that projects at least one laser beam that forms a laser emission plane between the first light intrusion plane and the second light intrusion plane; and
a controller unit comprising a processor, and a memory that stores computer-executable instructions that, in response to execution by the processor, cause the processor to perform operations comprising:
activating the at least one laser emitter of the laser filter frame structure to create the laser emission plane,
in response to detecting an object passing through the first light intrusion plane, deactivating the at least one laser emitter of the laser filter frame structure to pause creation of the laser emission plane, and
in response to detecting that the object has passed through the first light intrusion plane but that the object has not passed through the second light intrusion plane, reactivating the at least one laser emitter of the laser filter frame structure to create the laser emission plane.

2. The laser filter system of claim 1, further comprising:
a position adjustment unit that attaches to the laser filter frame structure and communicatively couples to the controller unit, wherein the position adjustment unit is configured to increase or decrease a separation distance formed between the laser emission plane and at least one of the first light intrusion plane or the second light intrusion plane.

3. The laser filter system of claim 2, wherein the laser emission plane created by the at least one laser emitter of the laser filter frame structure is configured to have a passive beam power in excess of five milliwatts.

4. The laser filter system of claim 3, wherein the at least one laser emitter of the laser filter frame structure is reactivated to provide a filtering beam power that is higher than the passive beam power.

5. The laser filter system of claim 1, wherein the laser emission plane created by the at least one laser emitter of the laser filter frame structure is configured to create ultraviolet light.

6. The laser filter system of claim 5, wherein the first light intrusion plane and the second light intrusion plane are configured to include infrared light.

7. The laser filter system of claim 1, wherein the laser filter frame structure is configured to reside within at least one of a network equipment cabinet, a user equipment housing, a threshold of a room, a computer housing, or a threshold of a passageway.

8. A laser filter system comprising:
a first plurality of intrusion detection frame structures that are configured to form a first plurality of light intrusion planes;
a second plurality of intrusion detection frame structures that are configured to form a second plurality of light intrusion planes;

a laser filter frame structure comprising at least one laser emitter that projects a laser beam that forms a laser emission plane between the first plurality of light intrusion planes and the second plurality of light intrusion planes; and a controller unit comprising a processor, and a memory that stores computer-executable instructions that, in response to execution by the processor, cause the processor to perform operations comprising:

activating the at least one laser emitter of the laser filter frame structure to create the laser emission plane, in response to detecting an object passing through at least one of the first plurality of light intrusion planes, deactivating the at least one laser emitter of the laser filter frame structure to pause creation of the laser emission plane, and in response to detecting that the object has passed through the first plurality of light intrusion planes but the object has not passed through at least one of the second plurality of light intrusion planes, reactivating the at least one laser emitter of the laser filter frame structure to create the laser emission plane.

9. The laser filter system of claim 8, wherein the operations further comprise:

adjusting a separation distance formed between the laser emission plane and at least one of the first plurality of light intrusion planes.

10. The laser filter system of claim 9, wherein the laser emission plane created by the at least one laser emitter of the laser filter frame structure is configured to have a passive beam power in excess of five milliwatts.

11. The laser filter system of claim 10, wherein the at least one laser emitter of the laser filter frame structure is reactivated to provide a filtering beam power that is higher than the passive beam power.

12. The laser filter system of claim 8, wherein the laser emission plane created by the at least one laser emitter of the laser filter frame structure is configured to create ultraviolet light.

13. The laser filter system of claim 12, wherein the first plurality of light intrusion planes and the second plurality of light intrusion planes are configured to include infrared light.

14. The laser filter system of claim 8, wherein the laser filter frame structure is configured to reside within at least one of a network equipment cabinet, a threshold of a room, a computer housing, or a threshold of a passageway.

15. A computer storage medium having computer-executable instructions stored thereon that, in response to execution by a processor of a laser filter system, cause the processor to perform operations comprising:

activating a first light intrusion plane created by a first intrusion detection frame structure;

activating a second light intrusion plane created by a second intrusion detection frame structure;

activating at least one laser emitter of a laser filter frame structure to create a laser emission plane, wherein the laser emission plane is created between the first light intrusion plane and the second light intrusion plane;

in response to detecting an object passing through the first light intrusion plane, deactivating the at least one laser emitter of the laser filter frame structure to pause creation of the laser emission plane; and in response to detecting that the object has passed through the first light intrusion plane but that the object has not passed through the second light intrusion plane, reactivating the at least one laser emitter of the laser filter frame structure to create the laser emission plane.

16. The computer storage medium of claim 15, wherein the operations further comprise:

adjusting a separation distance that separates the laser emission plane from the first light intrusion plane.

17. The computer storage medium of claim 15, wherein the laser emission plane created by the at least one laser emitter of the laser filter frame structure is configured to have a passive beam power in excess of five milliwatts.

18. The computer storage medium of claim 17, wherein the at least one laser emitter of the laser filter frame structure is reactivated to provide a filtering beam power that is higher than the passive beam power.

19. The computer storage medium of claim 18, wherein the laser emission plane created by the at least one laser emitter of the laser filter frame structure is configured to create ultraviolet light.

20. The computer storage medium of claim 19, wherein the first light intrusion plane and the second light intrusion plane are configured to include infrared light.

\* \* \* \* \*